(12) United States Patent
Janicek et al.

(10) Patent No.: US 7,099,140 B2
(45) Date of Patent: Aug. 29, 2006

(54) METHOD AND APPARATUS FOR COMBINING PTCR/OL AND RUN CAPACITOR

(75) Inventors: Alan Joseph Janicek, Morrison, IL (US); Kennett Ray Fuller, Morrison, IL (US); Mark Alan Heflin, Davenport, IA (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 10/065,669

(22) Filed: Nov. 7, 2002

(65) Prior Publication Data
US 2004/0090752 A1 May 13, 2004

(51) Int. Cl.
*H01G 4/228* (2006.01)

(52) U.S. Cl. .................. 361/306.3; 361/302; 361/305; 361/15; 361/766; 361/797; 439/79; 439/80; 439/76.1; 174/40 R; 174/65 R

(58) Field of Classification Search .................. 361/15, 361/785, 766, 797, 302–305; 439/79–80, 439/76.1, 620, 767, 770; 174/40 R, 65 R, 174/138 G
See application file for complete search history.

(56) References Cited

U.S. PATENT DOCUMENTS

| | | |
|---|---|---|
| 3,965,392 A | 6/1976 | Moorhead et al. |
| 4,037,316 A | 7/1977 | Stoll |
| 4,042,860 A | 8/1977 | Woods et al. |
| 4,084,202 A | 4/1978 | Stoll |
| 4,107,583 A | 8/1978 | Houtman |
| 4,131,871 A | 12/1978 | Haag et al. |
| 4,161,681 A | 7/1979 | Rathje |
| 4,237,508 A | 12/1980 | Woods et al. |
| 4,237,510 A | 12/1980 | Thompson, Jr. et al. |
| 4,241,494 A | 12/1980 | Woods |
| 4,267,635 A | 5/1981 | Blaha |
| 4,327,481 A | 5/1982 | Woods |
| 4,331,905 A | 5/1982 | Owen |
| 4,355,458 A | 10/1982 | Woods et al. |
| 4,360,852 A | 11/1982 | Gilmore |
| 4,361,799 A | 11/1982 | Lutz |
| 4,378,514 A | 3/1983 | Collins |
| 4,437,042 A | 3/1984 | Morais et al. |
| 4,484,165 A | 11/1984 | Grenier et al. |
| 4,502,033 A | 2/1985 | Grenier |
| 5,021,915 A | 6/1991 | Wandler et al. |
| 5,053,908 A | 10/1991 | Cooper et al. |
| 5,170,307 A | 12/1992 | Nacewicz et al. |
| 5,548,464 A | 8/1996 | Manning |
| 5,585,990 A | 12/1996 | Manning et al. |
| 5,729,416 A | 3/1998 | Renkes et al. |
| 5,739,999 A | 4/1998 | Gruber et al. |
| 6,122,154 A | 9/2000 | Damerow et al. |
| 6,169,648 B1 | 1/2001 | Denvir et al. |
| 6,231,370 B1 * | 5/2001 | Morin et al. ................. 439/366 |

(Continued)

*Primary Examiner*—Nguyen T. Ha
(74) *Attorney, Agent, or Firm*—Rodney M. Young, Esq.; Armstrong Teasdale LLP

(57) ABSTRACT

A combination run capacitor/positive temperature coefficient resistor/overload (CAP/PTCR/OL) module is described. The cover of the combination housing includes a capacitor compartment and terminal openings for receiving blade terminals of a run capacitor. The terminal openings in the cover align with blade receiving receptacles coupled to the PTCR start circuit. The blade terminals of a run capacitor are inserted into the receptacle openings and into electrical engagement with the blade receiving receptacles. The capacitor is supported and protected by a potting mixture filling the capacitor compartment.

16 Claims, 5 Drawing Sheets

U.S. PATENT DOCUMENTS

| | | |
|---|---|---|
| 6,239,523 B1 | 5/2001 | Janicek et al. |
| 6,249,104 B1 | 6/2001 | Janicek |
| 6,331,742 B1 * | 12/2001 | Renkes et al. ............ 310/68 C |
| 6,456,470 B1 | 9/2002 | Cecconi |
| 6,459,042 B1 * | 10/2002 | Stilianos et al. ........ 174/138 G |
| 6,773,272 B1 * | 8/2004 | Koehler et al. ................ 439/79 |

* cited by examiner

METHOD AND APPARATUS FOR COMBINING PTCR/OL AND RUN CAPACITOR

BACKGROUND OF INVENTION

This invention relates generally to electric motors, and more particularly, to a motor starting device.

At least some known electric motors include a start or auxiliary winding and a run winding. Either the start or run winding may be used to initiate rotation of a motor rotor. More specifically, when the start and run windings are energized, a geometric and time phase relationship between magnetic fields generated by the run and start windings, and the magnetization of the rotor, cause the rotor to begin rotating from a standstill condition. Once the rotor has sufficient torque to attain its normal running speed, the start winding is disconnected from the motor circuit.

Start and run capacitors are sometimes used to change the time phase relationship between magnetic fields generated by the run and start or auxiliary windings. If a run capacitor is connected in series with the start winding, rather than disconnecting the start winding once sufficient rotor torque is attained, the start winding may be utilized as an auxiliary run winding after motor start-up. More specifically, an auxiliary run winding facilitates improving motor efficiency and power factor. A motor starting switch may be used to control energizing and de-energizing the motor start winding or start capacitor. At least some known motors include a positive temperature coefficient resistor/over load (PTCR/OL) used to perform this switching function.

In at least some hermetic compressor applications, a separate PTCR/OL and run capacitor are externally mounted to the compressor housing. The PTCR/OL and capacitor are then electrically coupled to the motor circuit. Accordingly, the capacitor and PTCR/OL must be assembled separately, and as such manufacturing costs are increased. Additionally, over time, the electrical and mechanical connection between the PTCR/OL and capacitor may deteriorate when exposed to adverse conditions.

SUMMARY OF INVENTION

In one aspect, a method of fabricating a run capacitor/positive temperature coefficient resistor/overload (CAP/PTCR/OL) assembly for an electric motor is provided. The method includes providing a base formed of electrically insulative material and including a surface and sidewalls extending from the surface to form a compartment, positioning a positive temperature coefficient resistor at least partially within the base compartment, positioning an overload at least partially within the base compartment, forming a cover from an electrically insulative material and including a first surface, an opposite second surface and a plurality of sidewalls extending from the first surface, the sidewalls are integrally formed with the first surface wherein the sidewalls extend from the first surface and form a compartment which is sized to at least partially receive a run capacitor, forming at least one aperture that extends through the cover internal to the compartment, and a plurality of projections that extend from the second surface, and coupling the cover to the base enclosing a plurality of components within the base compartment.

In another aspect, a run capacitor/positive temperature coefficient resistor/overload (CAP/PTCR/OL) assembly is provided. The assembly includes a base formed of electrically insulative material and includes a first surface and a plurality of sidewalls extending therefrom to form a compartment with the first surface, a positive temperature coefficient resistor at least partially contained within the base compartment, an overload at least partially contained within the base compartment, and a cover formed of electrically insulative material, the cover coupled to the base enclosing the components within the base compartment and comprising a first surface, an opposite second surface and a plurality of sidewalls extending from the first surface and are integrally formed with the first surface, the sidewalls extend from the first surface and form a compartment sized to at least partially receive a run capacitor assembly therein, at least one aperture extending through the cover internal to the compartment, and a plurality of projections extending from the second surface.

In yet another aspect, a run capacitor/positive temperature coefficient resistor/overload (CAP/PTCR/OL) assembly cover is provided. The cover is configured to couple to a PTCR/OL base. The cover includes a first surface, a plurality of sidewalls that extend from the first surface and are integrally formed with the first surface, the sidewalls extend from the first surface and form a compartment that is sized to at least partially receive a run capacitor assembly therein, at least one aperture extending through the cover internal to the compartment, a second surface, opposite to the first surface and a plurality of projections extending from the second surface.

In another aspect, a run capacitor/positive temperature coefficient resistor/overload (CAP/PTCR/OL) assembly cover is provided. The cover is configured to couple to a PTCR/OL base. The cover includes a first surface, a plurality of sidewalls that extend from the first surface and are integrally formed with said first surface, the sidewalls extend from the first surface and form a platform that is sized to at least partially receive a run capacitor assembly thereon, at least one aperture extending through the platform, a second surface, opposite to the first surface and, a plurality of, projections extending from the second surface.

DETAILED DESCRIPTION

Figure 1:
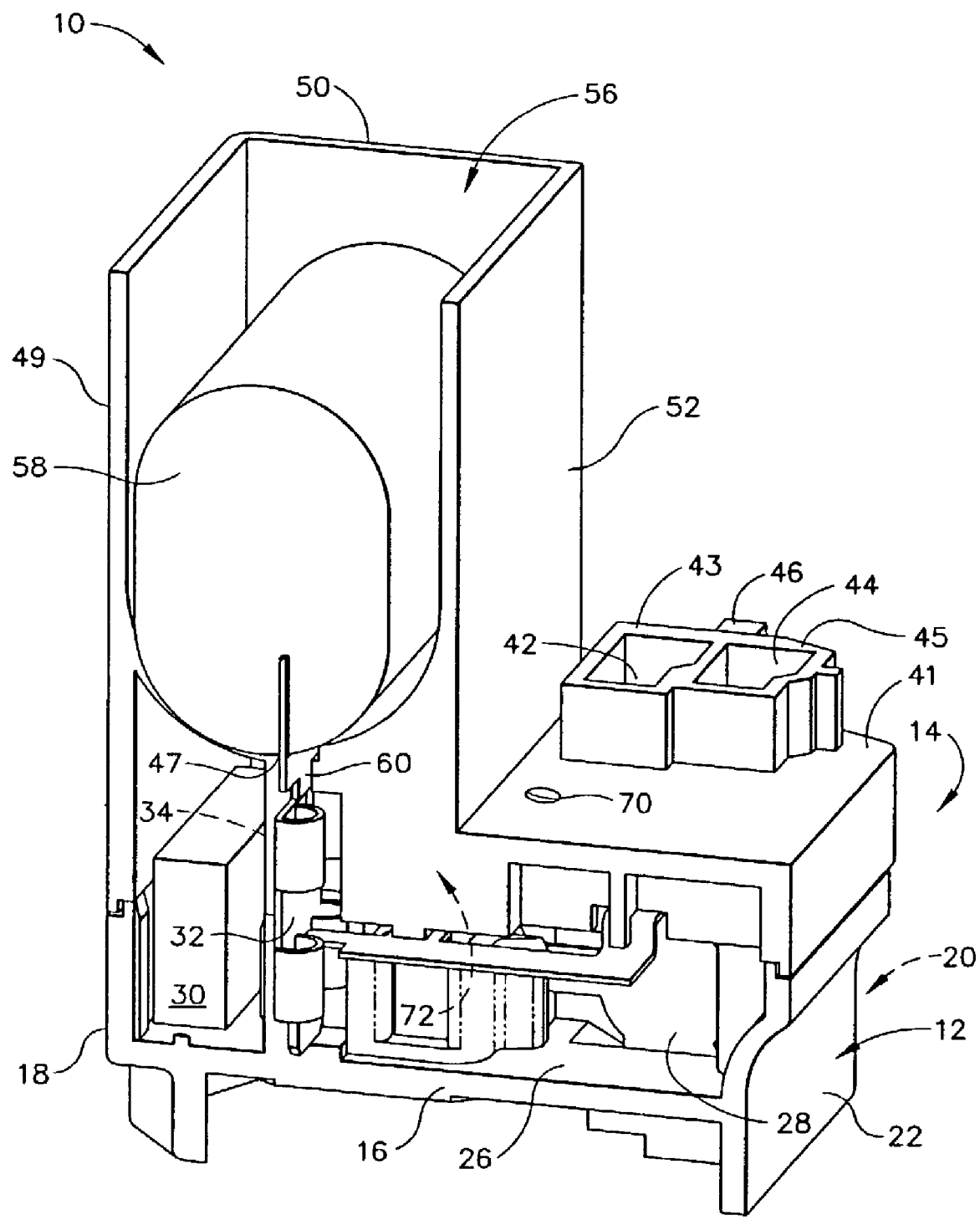
FIG. 1 is a cut away side view of a run capacitor/positive temperature coefficient resistor/overload (CAP/PTCR/OL) module.

FIG. 1 is a cut away side view of a run capacitor/positive temperature coefficient resistor/overload (CAP/PTCR/OL) module 10 including a base 12 coupled to a cover 14. In the exemplary embodiment, base 12 is a base PTCR/OL, model 3ARR55 PTCR/OL base available from GE Industrial Systems, Morrison, Ill. Base 12 includes a base surface 16 and a plurality of sidewalls 18, 20, 22 and 24 extending from base surface 16. Sidewall 24 is cut away in FIG. 1. More specifically, sidewalls 18, 20, 22 and 24 define a partial compartment 26 with base surface 16. Mounted within base compartment 26 is a PTCR 28 and an overload 30. PTCR 28 is a disk type PTCR. In one embodiment, PTCR 28 is a PTCR disk available from Vishay Cera-Mite, Grafton, Wis. Terminal receiving connectors 32 and 34 are also positioned within base compartment 26.

Cover 14 couples to base 12 to form an enclosure with base 12. Cover 14 is secured to base 12 using a rivet and/or heat staking treatment, for example, such that external contaminants which might damage PTCR disk 28 or overload 30 are prevented from entering into module 10. In addition, cover 14 facilitates containing any failure that may occur within module 10.

Cover 14 includes a top surface 41 and a plurality of power lead openings 42 and 44. Openings 42 and 44 are sized to receive leads from a power source (not shown). The specific configuration of openings 42 and 44 is variable depending on a user's preference. For example, in one embodiment, a dual receptacle plug is used. In the exemplary embodiment, power lead openings 42 and 44 are circumscribed by walls 43 and 45, respectively. Walls 43 and 45 extend from cover top surface 41 and facilitate preventing an inadvertent reversed polarity connection of a power connector (not shown). In the exemplary, sidewalls 43 and 45 include a tab 46. Tab 46 engages a pawl (not shown) on a power connector (not shown) to facilitate securely coupling the power connector to the power lead openings 42 and 44.

Cover 14 also includes a plurality of run capacitor terminal lead apertures 47 and 48 (shown in FIG. 2) circumscribed by a plurality of sidewalls 49, 50, 52 and 54 which are integrally formed with cover 14. Sidewall 54 is cut away in FIG. 1. Sidewalls 49, 50, 52 and 54 extend from cover top surface 41 and form a partial compartment 56. When cover 14 is fully assembled to base 12, a run capacitor 58 and potting material (not shown) are contained within compartment 56. A height of sidewalls 49, 50, 52 and 54 is variably sized depending on a size of capacitor used in the particular application. The potting compound covers run capacitor 58 and fills the entire compartment 56 and to facilitate protecting run capacitor 58 from moisture which may accumulate as a result of splashing or condensation. In one embodiment, the potting compound is UR-330, parts A and B, commercially available from Thermoset, Lord Chemical, Indianapolis, Ind.

Run capacitor 58, is a film capacitor with terminals 60 and 62 (shown in FIG. 2) electrically and mechanically attached to run capacitor 58. Run capacitor terminal lead apertures 47 and 48 (shown in FIG. 2) extend through cover top surface 41, and when cover 14 is coupled to base 12, apertures 47 and 48 align with terminal receiving connectors 32 and 34 located in base 12. Additionally, when cover 14 is coupled to base 12, run capacitor terminals 60 and 62 are aligned with apertures 47 and 48 and connectors 32 and 34 such that connectors 32 and 34 receive terminals 60 and 62 in sliding engagement. In one embodiment, cover top surface 41 is shaped to extend arcuately into compartment 56 and facilitates reducing an amount of potting compound required to fill compartment 56. A shape of top surface 41 is selected to substantially reduce an overall volume of compartment 56 while still permitting run capacitor 58 to be received therein.

Cover 14 also includes a fastener opening 70 which, when cover 14 is coupled to base member 12, aligns with an opening 72 formed in base 12. In one embodiment, a rivet may be inserted through aligned openings 70 and 72 and crimped to maintain cover 14 secured to base 12. In another embodiment, a plastic post replaces the eyelet to secure cover 14 to base 12 with heat stake of the plastic post. In still another embodiment, the cover 14 is secured to base 12 with an adhesive compound disposed along the upper edge of sidewalls 18, 20, 22 and 24.

Figure 2:
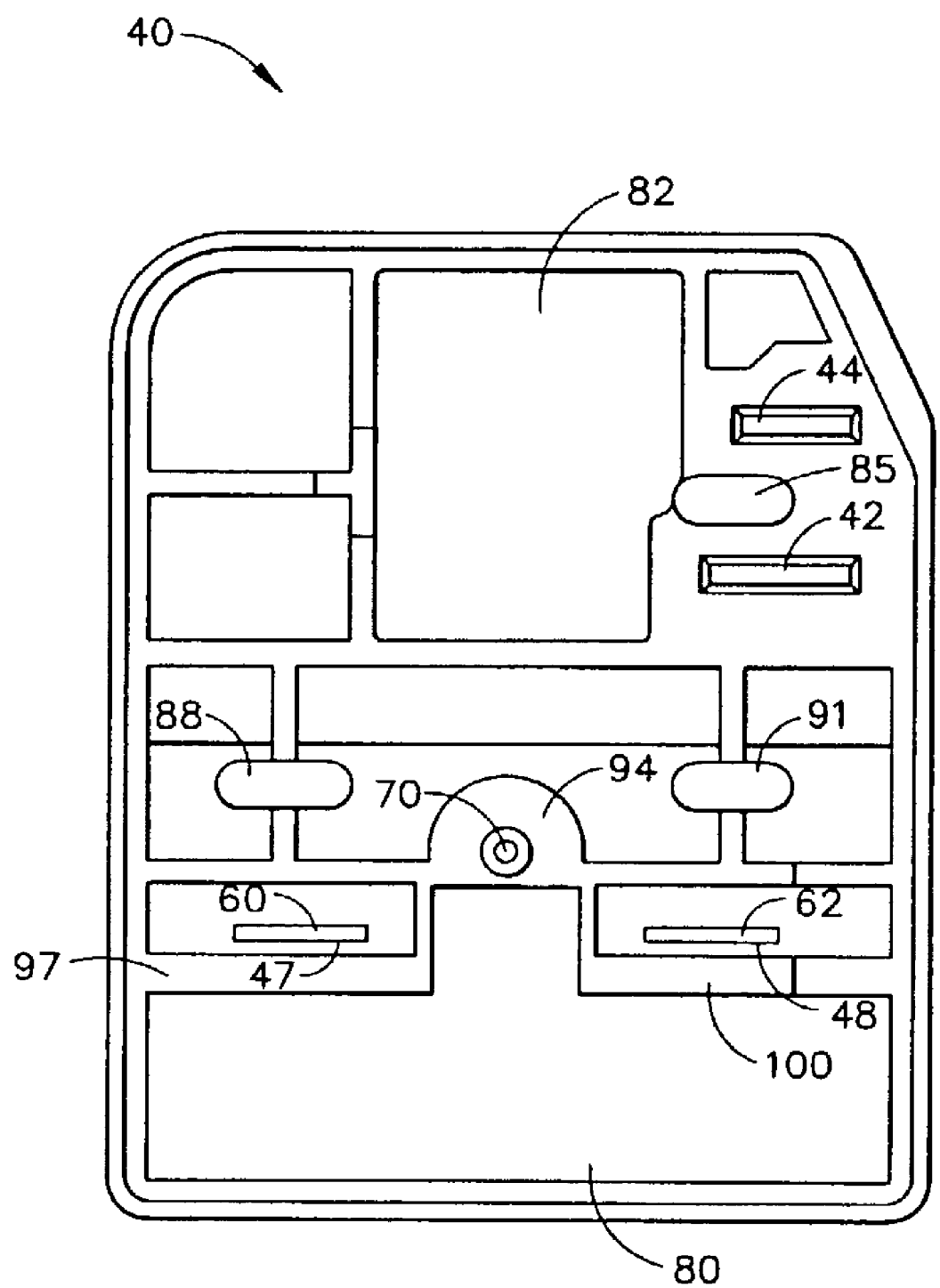
FIG. 2 is a bottom plan view of the run capacitor/positive temperature coefficient resistor/overload (CAP/PTCR/OL) module cover.

FIG. 2 is a bottom plan view of the run capacitor/positive temperature coefficient resistor/overload (CAP/PTCR/OL) module cover 14 and illustrates an internal structure of cover 14. More particularly, cover 14 includes a bottom surface 78, opposing top surface 41, an overload cavity 80 for receiving a portion of overload 30 and a PTCR cavity 82 for receiving a portion of PTCR disk 28. An electrical barrier 85 provides spacing between power leads (not shown) which may be inserted through openings 42 and 44. A plurality of platforms 88, 91, and 94 are configured to be in substantial surface-to-surface contact with platforms (not shown) of base 12 and provide additional support for assembled module 10. Electrical barriers 97 and 100 circumscribe apertures 47 and 48 and facilitate electrically isolating run capacitor terminals 60 and 62 from each other and overload 30. Opening 70 extends through cover 14 to provide access to a similarly aligned fastener connection in base 12. In another embodiment, opening 70, is replaced by an alignment post.

Cover 14 and base 12 may be formed from many different types of materials. In one embodiment, cover 14 and base member 12 are formed from electrically insulative plastic materials such as thermoplastic or thermoset materials utilizing an injection molding process. Terminals 60 and 62 may be formed, for example, from stainless steel, copper, brass or other well known conductive materials. Many different variations and modifications of module 10 are contemplated. For example, overload 30 could include one of many various other switches or cut-out controls. Also, rather than PTCR disk 28, various other motor starter switches could be utilized.

Figure 3:
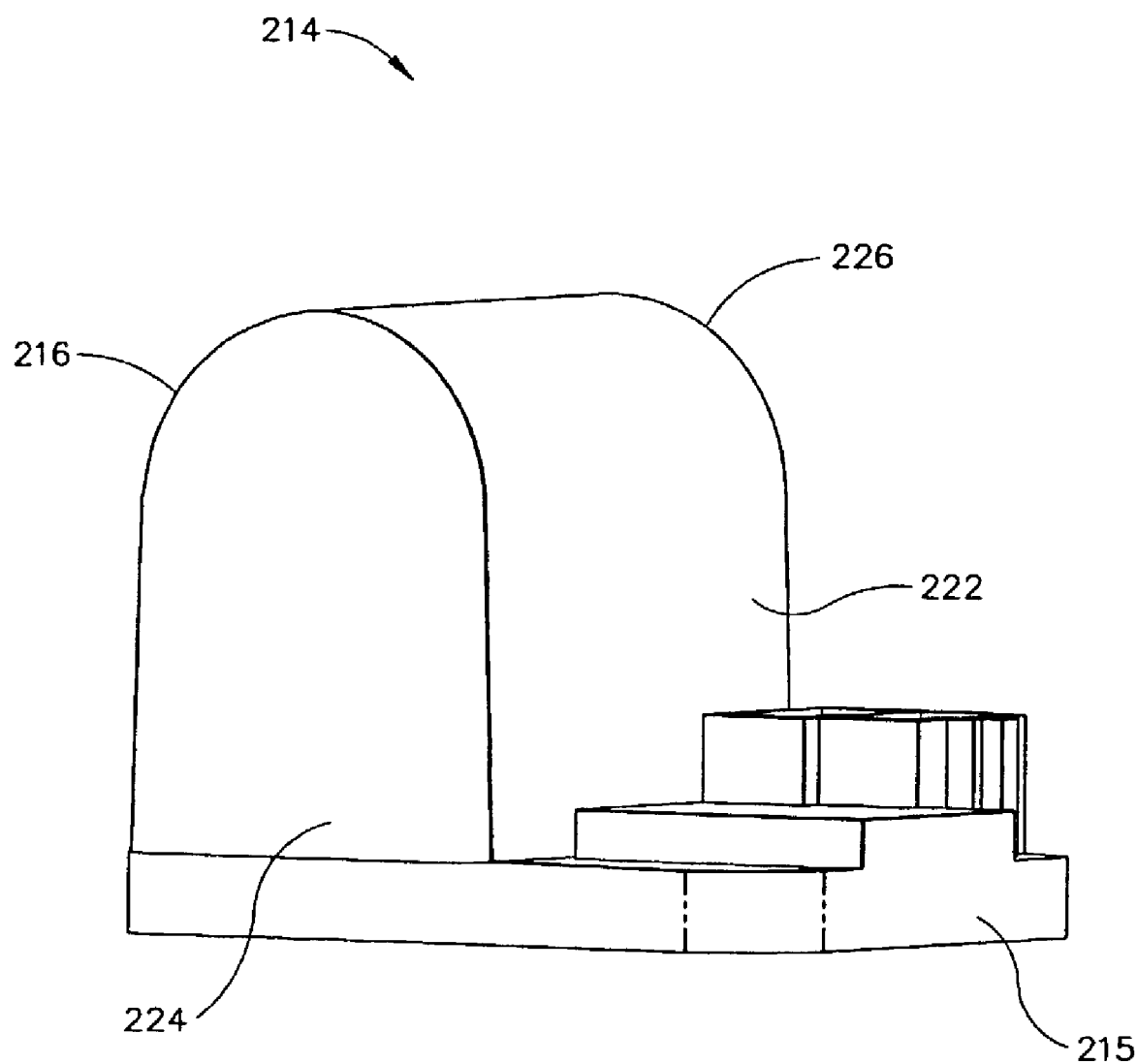
FIG. 3 is a side view of a run capacitor/positive temperature coefficient resistor/overload (CAP/PTCR/OL) module cover.
Figure 4:
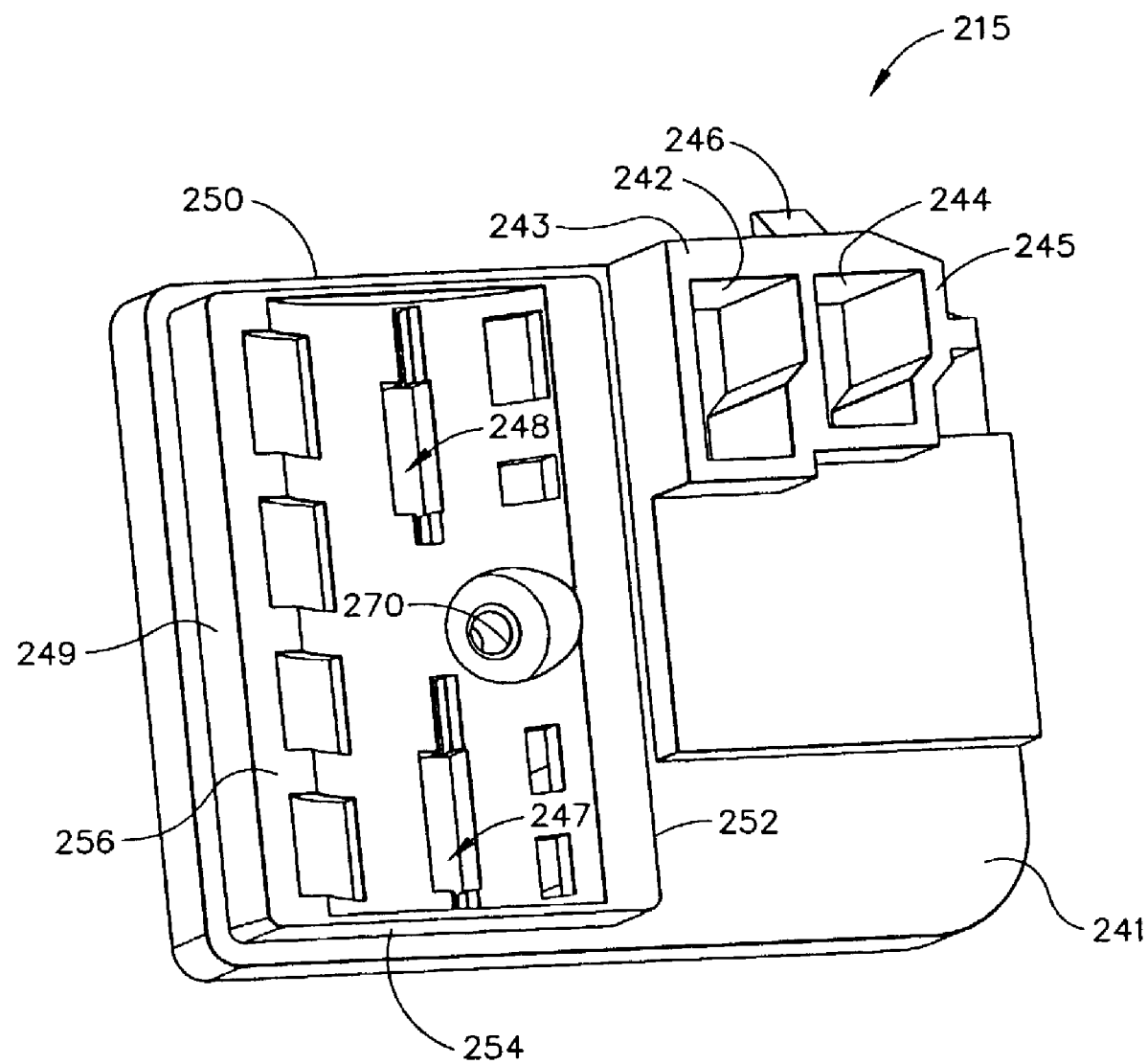
FIG. 4 is a plan view of a (CAP/PTCR/OL) module cover base with capacitor compartment cover removed.
Figure 5:
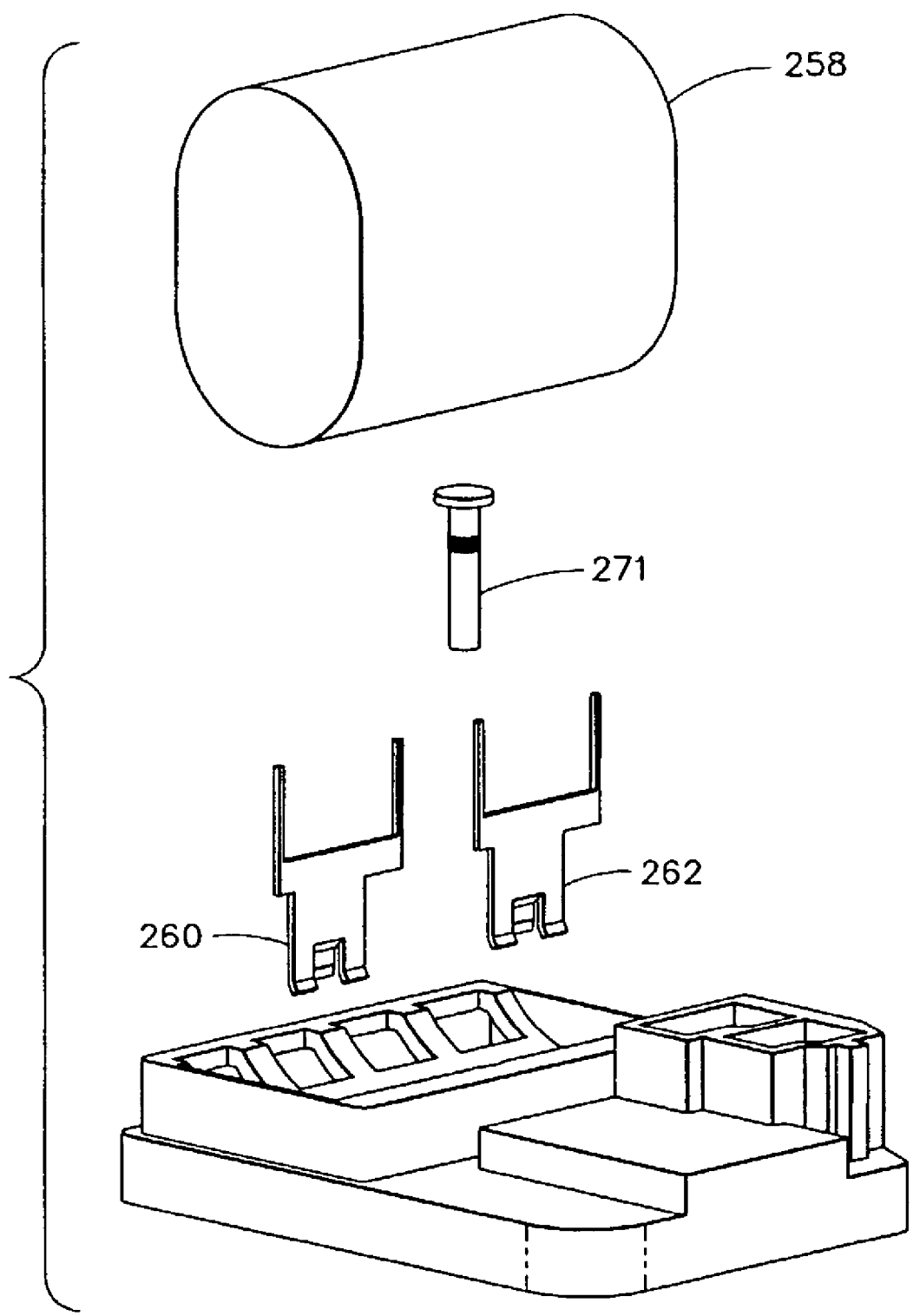
FIG. 5 is an exploded view of (CAP/PTCR/OL) module cover base with capacitor compartment cover removed.

FIGS. 3, 4, and 5 show an alternative embodiment of the run capacitor/positive temperature coefficient resistor/overload (CAP/PTCR/OL) module cover. FIG. 3 is a side view of a run capacitor/positive temperature coefficient resistor/overload (CAP/PTCR/OL) module cover 214. Cover 214 includes a base 215 coupled to a capacitor compartment cover 216. FIG. 4 is a plan view of cover base 215 with capacitor compartment cover 216 removed. FIG. 5 is an exploded view of cover base 215 with capacitor compartment cover 216 removed. Identical components in FIGS. 3, 4 and 5 are numbered using the same reference numerals in each figure.

When fully assembled, cover 214 is configured to couple to base 12 (shown in FIG. 1) in a similar manner as cover 14 (shown in FIG. 1).

Capacitor compartment cover 216 is a hollow body that includes a plurality of sidewalls 218 (not shown), 220 (not shown) 222 and 224. The sidewalls extend to an upper semi-cylindrical top 226 integrally formed with the sidewalls.

Cover 214 includes a top surface 241 and a plurality of power lead openings 242 and 244. Openings 242 and 244 are sized to receive leads from a power source (not shown). The specific configuration of openings 242 and 244 is variable depending on a user's preference. For example, in one embodiment, a dual receptacle plug is used. In the exemplary embodiment, power lead openings 242 and 244 are circumscribed by walls 243 and 245, respectively. Walls 243 and 245 extend from cover top surface 241 and facilitate preventing an inadvertent reversed polarity connection of a power connector (not shown). In the exemplary embodiment, sidewalls 243 and 245 include a tab 246. Tab 246 engages a pawl (not shown) on a power connector (not shown) to facilitate securely coupling the power connector to the power lead openings 242 and 244.

Cover 214 also includes a plurality of run capacitor terminal lead apertures 247 and 248 circumscribed by a plurality of sidewalls 249, 250, 252 and 254 which are integrally formed with cover 214. Sidewalls 249, 250, 252 and 254 extend from cover top surface 241 and form a capacitor platform 256. When cover 214 is fully assembled to capacitor compartment cover 216, a run capacitor 258 and potting material (not shown) are contained within capacitor compartment cover 216. A height of capacitor compartment cover sidewalls 218, 220, 222 and 224 is variably sized depending on a size of capacitor used in the particular application. The potting compound covers run capacitor 258 and fills the entire capacitor compartment cover 216 to facilitate protecting run capacitor 258 from moisture which may accumulate as a result of splashing or condensation. In one embodiment, the potting compound is UR-330, parts A and B, commercially available from Thermoset, Lord Chemical, Indianapolis, Ind.

Run capacitor 258, is a film capacitor with terminals 260 and 262 electrically and mechanically attached to run capacitor 258. Run capacitor terminal lead apertures 247 and 248 extend through cover top surface 241, and when cover 214 is coupled to base 12 (shown in FIG. 1), apertures 247 and 248 align with terminal receiving connectors 32 (shown in FIG. 1) and 34 (shown in FIG. 1) located in base 12. Additionally, when cover 214 is coupled to base 12, run capacitor terminals 260 and 262 are aligned with apertures 247 and 248 and connectors 32 and 34 such that connectors 32 and 34 receive terminals 260 and 262 in sliding engagement.

Cover 214 also includes a fastener opening 270 which, when cover 214 is coupled to base member 12, aligns with an opening 72 (shown in FIG. 1) formed in base 12. In one embodiment, a rivet 271 may be inserted through aligned openings 270 and 72 and crimped to maintain cover 214 secured to base 12. In another embodiment, a plastic post replaces rivet 271 to secure cover 214 to base 12 with heat stake of the plastic post. In still another embodiment, the cover 214 is secured to base 12 with an adhesive compound disposed along the upper edge of sidewalls 18, 20, 22 and 24 (shown in FIG. 1).

During assembly, capacitor 258, and capacitor terminals 260 and 262 are coupled to capacitor platform 256 with terminal 260 extending through aperture 247 and terminal 262 extending through aperture 248. Rivet 271 extends through aperture 270. Capacitor compartment cover 216 is coupled to base 215 such that sidewalls 218, 220, 222 and 224 circumscribe capacitor platform 256. Assembled cover 214 is inverted wherein capacitor compartment cover 216 forms a cup and potting material (not shown) is poured into cover 216 to a level sufficient to encapsulate capacitor platform 256.

The combination run capacitor, PTCR and overload module embodiments described herein provide the advantage that the motor run capacitor, PTCR and overload are disposed within one housing. The combination eliminates the need for a capacitor mounting post on the cover, which is the most impact sensitive structure on the cover. Further, the module can be easily and quickly coupled to an electric motor. Such a configuration reduces the expense associated with mounting such a run capacitor, PTCR and overload combination to an electric motor.

While the invention has been described in terms of various specific embodiments, those skilled in the art will recognize that the invention can be practiced with modification within the spirit and scope of the claims.

The invention claimed is:

1. A run capacitor/positive temperature coefficient resistor/overload (CAP/PTCR/OL) assembly cover configured to couple to a PTCR/OL base comprising:
   a first surface;
   a plurality of sidewalls that extend from said first surface and are integrally formed with said first surface, said sidewalls extend from said first surface and form a compartment that is sized to at least partially receive a run capacitor therein;
   at least one aperture extending through said cover internal to said compartment;
   a second surface, opposite to said first surface; and
   a plurality of projections extending from said second surface.

2. A cover in accordance with claim 1 wherein said cover sidewalls extend substantially perpendicularly from said cover first surface.

3. A cover in accordance with claim 1 wherein the run capacitor and at least one electrical terminal are positioned within said cover compartment such that said terminal extends through said aperture.

4. A cover in accordance with claim 3 wherein said run capacitor assembly is potted in said cover compartment.

5. A cover in accordance with claim 1 wherein said cover further comprises at least one aperture extending through said cover external to said cover compartment to receive at least one electrical terminal assembly.

6. A cover in accordance with claim 5 wherein said cover further comprises a wall integrally formed with said cover first surface, said wall circumscribing said aperture.

7. A cover in accordance with claim 1 wherein a portion of said cover extends into said cover compartment.

8. A cover in accordance with claim 1 wherein said plurality of projections are configured to extend into a base compartment to engage a plurality of components disposed internally in the base compartment.

9. A cover in accordance with claim 1 wherein the cover compartment is configured to receive the run capacitor.

10. A run capacitor/positive temperature coefficient resistor/overload (CAP/PTCR/OL) assembly cover configured to couple to a PTCR/OL base comprising:
    a first surface;
    a plurality of sidewalls that extend from said first surface and are integrally formed with said first surface, said sidewalls extend from said first surface and form a platform that is sized to at least partially receive a run capacitor thereon, wherein said cover is configured to couple to an enclosure configured to enclose at least a portion of the run capacitor;
    at least one aperture extending through said platform;
    a second surface, opposite to said first surface; and
    a plurality of projections extending from said second surface.

11. A cover in accordance with claim 10 wherein said cover sidewalls extend substantially perpendicularly from said cover first surface.

12. A cover in accordance with claim 10 wherein the run capacitor and at least one electrical terminal are positioned within said platform such that said terminal extends through said aperture.

13. A cover in accordance with claim 12 wherein said cover circumscribes said platform, said enclosure filled by a potting material thereby encapsulating said run capacitor assembly.

14. A cover in accordance with claim 10 wherein said cover further comprises at least one aperture extending through said cover external to said platform to receive at least one electrical terminal assembly.

15. A cover in accordance with claim 14 wherein said cover further comprises a wall integrally formed with said cover first surface, said wall circumscribing said aperture.

16. A cover in accordance with claim 10 wherein said plurality of projections are configured to extend into a base compartment to engage a plurality of components disposed internally in the base compartment.

* * * * *